United States Patent [19]
Gizowski

[11] Patent Number: 6,139,737
[45] Date of Patent: Oct. 31, 2000

[54] TRANSMISSION FLUID FILTER HAVING A FERRITE-FILLED NYLON MAGNETIC BODY

[75] Inventor: John W. Gizowski, LaGrange Park, Ill.

[73] Assignee: SPX Corporation, Muskegon, Mich.

[21] Appl. No.: 09/148,294

[22] Filed: Sep. 4, 1998

[51] Int. Cl.$^7$ .......................... B01D 35/06; B01D 35/147
[52] U.S. Cl. .......................................... 210/223; 210/222
[58] Field of Search ................... 210/222, 223; 264/DIG. 58, 442, 445

[56] References Cited

U.S. PATENT DOCUMENTS

| | | |
|---|---|---|
| 2,522,082 | 9/1950 | Arnold . |
| 2,887,230 | 5/1959 | Sicard . |
| 2,926,787 | 3/1960 | Combest . |
| 2,976,999 | 3/1961 | Paton . |
| 3,124,725 | 3/1964 | Leguillon . |
| 3,136,720 | 6/1964 | Baerman . |
| 3,342,339 | 9/1967 | Riolo . |
| 3,727,761 | 4/1973 | Aspinwall et al. . |
| 3,784,011 | 1/1974 | Ward . |
| 3,890,232 | 6/1975 | Combest et al. . |
| 3,985,588 | 10/1976 | Lyman . |
| 4,053,410 | 10/1977 | Lorimor . |
| 4,067,810 | 1/1978 | Sullivan ................................. 210/223 |
| 4,082,665 | 4/1978 | Schneider et al. ..................... 210/91 |
| 4,218,320 | 8/1980 | Liaw ..................................... 210/223 |
| 4,316,801 | 2/1982 | Cooper ................................... 210/90 |
| 4,372,852 | 2/1983 | Kovacs . |
| 4,495,068 | 1/1985 | Rosaen . |
| 4,496,303 | 1/1985 | Loubier . |
| 4,629,558 | 12/1986 | Garrity ................................... 210/130 |
| 4,689,144 | 8/1987 | Holmes . |
| 5,078,871 | 1/1992 | McCready ............................. 210/222 |
| 5,089,129 | 2/1992 | Brignman ............................. 210/223 |
| 5,174,892 | 12/1992 | Davis ..................................... 210/131 |
| 5,556,540 | 9/1996 | Brunsting ............................. 210/222 |

FOREIGN PATENT DOCUMENTS

| | | |
|---|---|---|
| 962739 | 6/1950 | France . |
| 1197569 | 7/1965 | Germany . |
| 1242316 | 6/1967 | Germany . |
| 1314202 | 4/1973 | United Kingdom . |
| 2042360 | 9/1980 | United Kingdom . |
| 2042914 | 10/1980 | United Kingdom . |

*Primary Examiner*—W. L. Walker
*Assistant Examiner*—Marianne S. Ocampo
*Attorney, Agent, or Firm*—Hovey, Williams, Timmons & Collins

[57] ABSTRACT

A transmission filter (10) includes a ring-shaped magnetic body (18) positioned therein in surrounding relationship with the filter media (14) to attract and retain magnetically susceptible particles in transmission fluid flowing through the filter (10). The preferred magnetic body (18) is integrally formed of ferrite-filled nylon, ultrasonically welded to the housing (12), and magnetically polarized only on the inboard surface (66) thereof.

5 Claims, 2 Drawing Sheets

TRANSMISSION FLUID FILTER HAVING A FERRITE-FILLED NYLON MAGNETIC BODY

RELATED APPLICATIONS

Not applicable.

FEDERALLY SPONSORED RESEARCH OR DEVELOPMENT

Not applicable

MICROFICHE APPENDIX

Not applicable.

BACKGROUND OF THE INVENTION

1. Field of the Invention

The present invention relates to the field of fluid filters. More particularly, the invention is concerned with a transmission filter having magnetic body positioned therein to attract and retain magnetically susceptible particles in transmission fluid flowing through the filter.

2. Description of the Related Art

In vehicles with automatic transmissions, transmission fluid is circulated through a filter to remove particles that may damage the mechanical components of the transmission. These particles may include metal that can be particularly damaging to the transmission components.

Some prior art transmission filters have included magnets therein to attract and retain magnetically susceptible metal particles that may be too small for effective removal by the filter media. In some of these prior art filters, the magnet is too small to be effective. Others are structurally complex and uneconomical to manufacture. In addition, some prior art filters present a magnetic field extending beyond the filter housing that may have an adverse effect on the electronic components of the vehicle.

SUMMARY OF THE INVENTION

The present invention solves the prior art problems mentioned above and provides a distinct advance in the state of the art. In particular, the transmission filter hereof is economical to manufacture, effectively filters magnetically susceptible particles from transmission fluid, and minimizes magnetic fields extending beyond the housing.

The preferred transmission fluid filter of the present invention includes a housing, filter media position in the housing, and a magnetic body positioned along the fluid flow path in the housing. The magnetic body is composed of synthetic resin material having magnetic particles dispersed therein to attract and retain magnetically susceptible particles present in transmission fluid flowing along the fluid flow path in the filter.

In preferred forms, the magnetic body has a ring-shaped configuration in surrounding relationship with the filter media and is ultrasonically welded to the housing. It is also preferred that only the inboard surface of the body is magnetically polarized.

DETAILED DESCRIPTION OF THE PREFERRED EMBODIMENT

Figure 1:
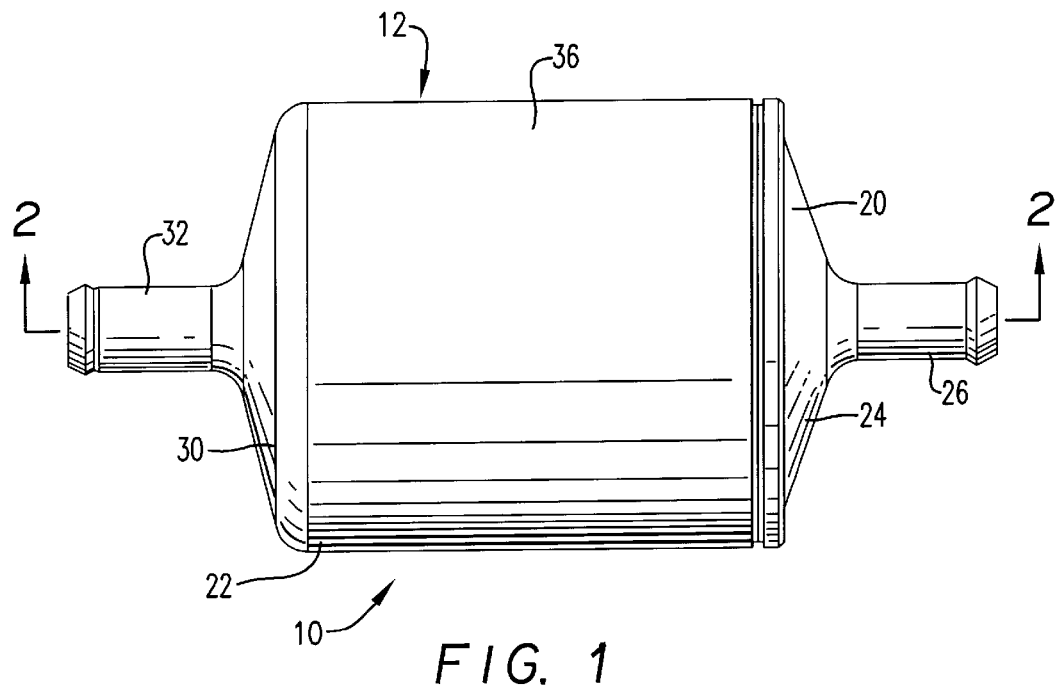
FIG. 1 is a side elevational view of the preferred transmission filter in accordance with the present invention.

The drawing figures illustrate preferred transmission filter 10 in accordance with the present invention. Filter 10 includes housing 12, filter media 14, bypass valve 16 and magnetic body 18.

Housing 12 is preferably composed of synthetic resin material such as glass-filled nylon and includes upper body 20 and lower body 22. Upper body 20 integrally includes inlet end wall 24 with tubular hose barb 26 extending therefrom defining transmission fluid inlet 28.

Lower body 22 integrally includes outlet end wall 30 with tubular hose barb 32 extending therefrom defining transmission fluid outlet 34, and further includes tubular central wall 36 extending from outlet end wall 30 opposite hose barb 32. Perforated, tubular, fluid collection post 38 extends from outlet end wall 30 axially along a portion of the length of central wall 36. Ultrasonic weld 40 joins the distal edge of central wall 36 to inlet end wall 24 as illustrated to form chamber 42 within housing 12 between inlet 28 and outlet 34.

Filter media 14 is received in chamber 42 in the fluid flow path between inlet 28 and outlet 34 as indicated by the arrows in the drawing figures. Media 14 surrounds post 38 and is spaced from interior face 44 of central wall 36. Respective inlet and outlet, media element end caps 46a and 46b retain filter media 14 in the position shown in FIG. 2. Seal 48, preferably composed of polyacrylate rubber, is positioned between outlet end cap 46b and outlet end wall 30 to provide a seal therebetween.

Bypass valve 16 includes tubular valve body 50 attached to and axially extending from the distal end of post 38. Valve 16 further includes plunger 52 slidably received in valve body 50 and plunger spring 54 received in valve body 50 between post 38 and plunger 52. Retainer 56 (integrally molded with upper body 20) is positioned between bypass valve 16 and inlet end wall 24, and retainer spring 58 attaches retainer 56 to end wall 24. If filter media 14 becomes plugged during use of filter 10, the differential pressure between inlet 28 and outlet 34 overcomes the bias of plunger spring 54 shifting plunger 52 toward post 38. This allows fluid to pass through valve body 50 into post 38 thereby bypassing filter media 14.

Figure 2:
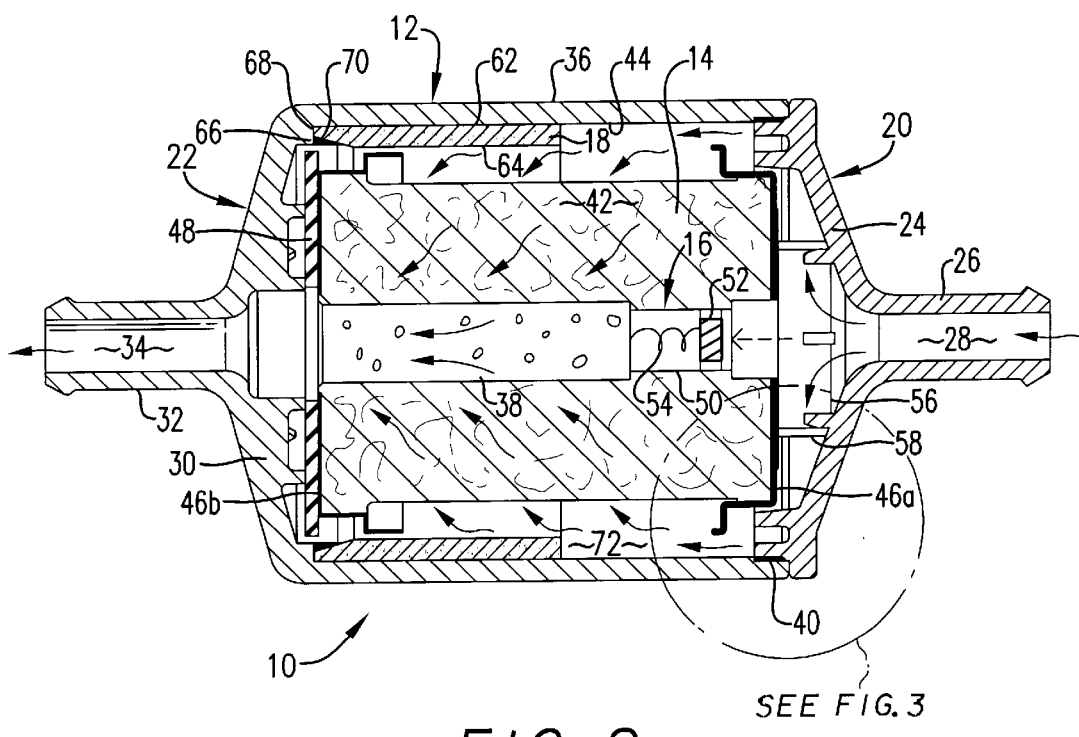
FIG. 2 is a sectional view of the preferred filter taken along line 2—2 of FIG. 1.
Figure 3:
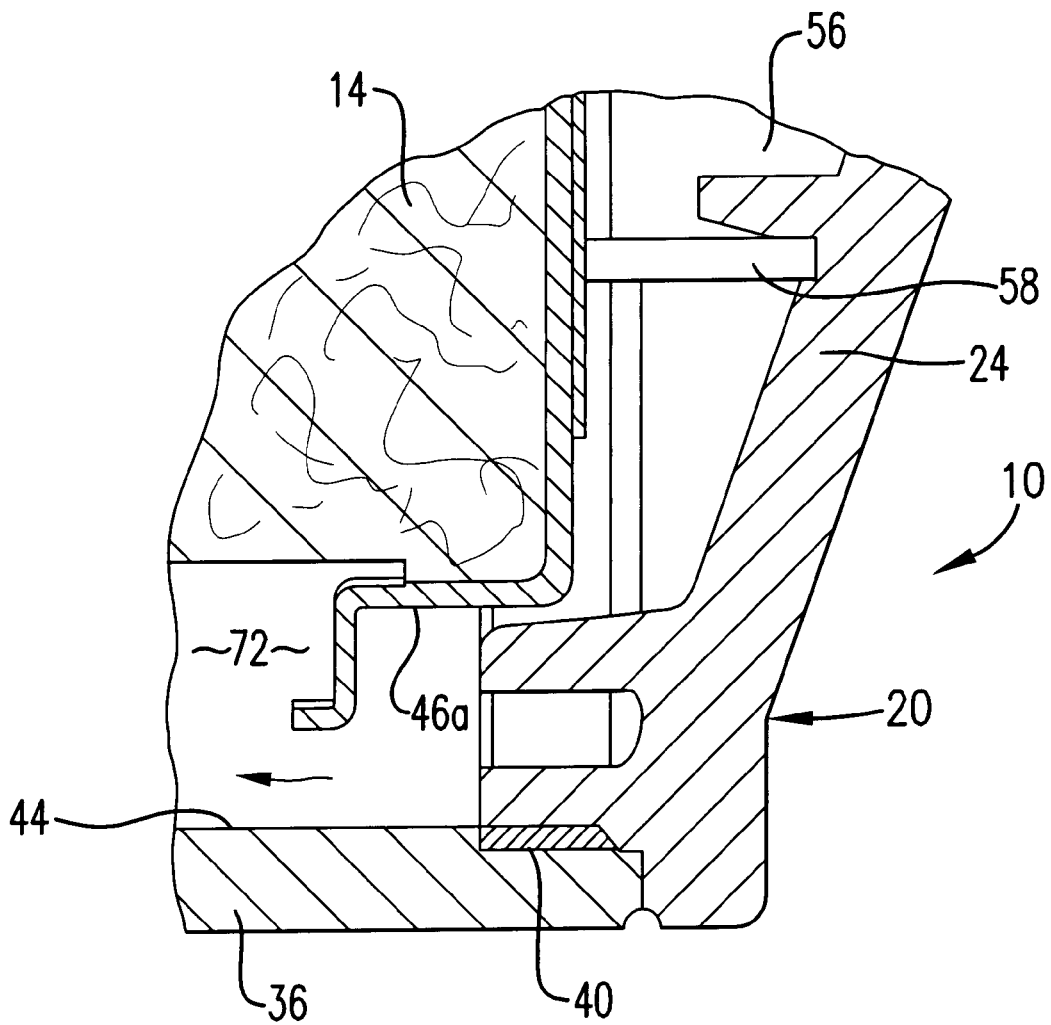
FIG. 3 is a detailed view of a portion of the filter of FIG. 2.

Magnetic body 18 is preferably composed of synthetic resin material having magnetic particles dispersed therein such as ferrite-filled nylon 6/6, and presents a ring-shaped configuration in surrounding relationship relative to filter media 14 as illustrated in FIG. 2. Body 18 presents outboard surface 62 positioned adjacent interior face 44 of central wall 36, and also presents inboard surface 64 facing filter media 14 and positioned along the flow path of fluid flowing through filter 10. Edge 68 of magnetic body 18 is beveled and ultrasonically welded at weld 66 in complementally configured slot 70 defined adjacent outlet end wall 30.

In the preferred embodiment, only inboard surface 64 of body 18 is magnetically polarized and outboard surface 62 is substantially devoid of magnetic polarization. This feature substantially minimizes magnetic fields external to filter 10. Such external magnetic fields could have an adverse effect on the electronic components of a vehicle either during or after installation of filter 10.

In operation, transmission fluid enters through inlet 28 and passes around inlet end cap 46a into space 72 between central wall 36 and filter media 14. While in space 72, at least a portion of the fluid passes along the magnetically polarized inboard surface 64 of magnetic body 18. As a result, magnetic body 18 attracts and retains magnetically susceptible particles present in the fluid. The transmission fluid then passes through filter media 14 where additional particles are removed. Perforated post 38 collects the filtered fluid after passage through media 14 and directs the fluid to outlet 34.

Those skilled in the art will now appreciate the advantages of the present invention. The synthetic resin composition of magnetic body 18 allows for ultrasonic welding to housing 12 which is not possible in the prior art using metallic magnets, and thereby enables economical manufacturing. Moreover, the ring-shaped configuration of magnetic body 18 presents a large surface area for collection of magnetically susceptible particles for increased effectiveness as compared to other shapes of magnetic bodies used in the prior art. Additionally, the magnetic polarization only on inboard surface 64 minimizes external magnetic fields that may adversely affect vehicle electronic components.

Those skilled in the art will also appreciate that the present invention encompasses many variations in the preferred embodiment described herein. For example, magnetic body 18 can be composed of synthetic materials other than the preferred ferrite-filled nylon, other attachment techniques can be used other than the preferred ultrasonic welding, and the magnetic body need not be limited to polarization of the inboard surface. Also, filter 10 can be used for other fluids such as oil. Having thus described the preferred embodiment of the present invention the following is claimed as new and desired to be secured by Letters Patent:

What is claimed is:

1. A fluid filter comprising:

a housing defining a chamber, an inlet into said chamber, an outlet from said chamber, and a first fluid flow path in said chamber between said inlet and said outlet;

a mechanical filter media positioned in said first flow path in order to filter fluid flowing along said first flow path, said filter media presenting an outer periphery;

a bypass valve positioned within said housing and communicating with the outlet to establish a second fluid flow path so that fluid bypasses the filter media by flowing from the inlet to the outlet without passing through the mechanical filter media when the valve is open; and a magnetic body within the housing configured to attract and retain magnetically susceptible particulates present in fluid flowing past the magnetic body, said magnetic body being concentrically spaced from the periphery of said filter media, said bypass valve configured such that fluid passing along said second fluid flow path does not contact said magnetic body.

2. The filter of claim 1, said filter media being elongated to present opposite ends and having a passageway that extends between said opposite ends, said bypass valve being located within said passageway to selectively prevent fluid flow through the passageway, said magnetic body having a ring-shaped configuration in surrounding relationship with said filter media.

3. The filter of claim 2, said magnetic body presenting an inboard surface and an opposite outboard surface, with only said inboard surface presenting magnetic polarization, said outboard surface being substantially devoid of magnetic polarization.

4. The filter of claim 2, each of said ends of the filter media being sealed except for an opening that communicates with the passageway, one of said ends of the filter media being positioned adjacent the inlet and the other of said ends of the filter media being positioned adjacent the outlet, said bypass valve being configured to selectively prevent fluid flow through the opening in said one end, such that fluid is required to pass through the filter media before entering the passageway when the bypass valve is closed and fluid is permitted to flow through the passageway without passing through the filter media when the valve is open.

5. The filter of claim 1, said magnetic body being composed of synthetic resin material having magnetic particles dispersed therein, said housing being composed of synthetic resin material, said magnetic body being ultrasonically welded to said housing.

* * * * *